US010272852B2

(12) United States Patent
Schaefer et al.

(10) Patent No.: US 10,272,852 B2
(45) Date of Patent: Apr. 30, 2019

(54) MOTOR VEHICLE WITH MOUNT FOR WARNING TRIANGLE

(71) Applicant: GM GLOBAL TECHNOLOGY OPERATIONS LLC, Detroit, MI (US)

(72) Inventors: Thilo Schaefer, Ruesselsheim (DE); Thomas Horst, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 222 days.

(21) Appl. No.: 15/191,011

(22) Filed: Jun. 23, 2016

(65) Prior Publication Data
US 2016/0375841 A1 Dec. 29, 2016

(30) Foreign Application Priority Data
Jun. 24, 2015 (DE) ........................ 10 2015 008 134

(51) Int. Cl.
*B60R 13/01* (2006.01)
*B60Q 7/00* (2006.01)
*B60R 11/00* (2006.01)
*B60J 5/10* (2006.01)

(52) U.S. Cl.
CPC .............. *B60R 13/011* (2013.01); *B60Q 7/00* (2013.01); *B60R 11/00* (2013.01); *B60R 13/013* (2013.01); *B60J 5/107* (2013.01); *B60R 2011/0036* (2013.01); *B60R 2013/016* (2013.01)

(58) Field of Classification Search
CPC ..... B60R 13/011; B60R 11/00; B60R 13/013; B60Q 7/00
USPC ........................... 296/146.8, 146.7, 37.13, 76
See application file for complete search history.

(56) References Cited

U.S. PATENT DOCUMENTS

| 5,347,846 | A | 9/1994 | Kitano et al. |
| 5,702,144 | A | 12/1997 | Matsuura et al. |
| 7,333,024 | B2 | 2/2008 | Nickolaou et al. |
| 8,141,933 | B2 * | 3/2012 | Nakamura ............... B60N 3/02 296/146.7 |
| 2007/0176452 | A1 | 8/2007 | Schultz et al. |
| 2012/0186225 | A1 | 7/2012 | Amann et al. |
| 2014/0292017 | A1 | 10/2014 | Bouillon et al. |

FOREIGN PATENT DOCUMENTS

| DE | 1047541 B | 12/1958 |
| DE | 10025451 A1 | 11/2001 |
| DE | 10118425 A1 | 10/2002 |
| DE | 102006020953 A1 | 1/2008 |
| DE | 102009057226 A1 | 6/2011 |

* cited by examiner

*Primary Examiner* — Joseph D. Pape
(74) *Attorney, Agent, or Firm* — Lorenz & Kopf, LLP

(57) ABSTRACT

A motor vehicle includes a vehicle body having a trunk and an inner lining fastened to the body and delimiting the trunk. A functional component, such as a warning triangle and/or a first-aid box, is secured to the vehicle body within the trunk. In particular, the functional component is fastened between the body and the inner lining in a holding position.

20 Claims, 4 Drawing Sheets

MOTOR VEHICLE WITH MOUNT FOR WARNING TRIANGLE

CROSS-REFERENCE TO RELATED APPLICATION

This application claims priority to German Patent Application No. 102015008134.9, filed Jun. 24, 2015, which is incorporated herein by reference in its entirety.

TECHNICAL FIELD

The present disclosure pertains to a motor vehicle with a trunk or boot, and more particularly to a storage compartment integrally formed therein.

BACKGROUND

Motor vehicles with seats for the conveying of people also have a trunk or boot for conveying material loaded therein. The trunk is generally delimited in a longitudinal direction of the motor vehicle on the front side by a back part of a rear seat and on the rear side in longitudinal direction by a lining on the trunk lid, tailgate or rear flap and a rear inner lining of the motor vehicle. Laterally, the trunk is delimited by inner linings as lateral linings on the body of the motor vehicle. On the lower side, the trunk is delimited by a trunk floor and the trunk floor serves for the support of loaded material on an upper side of the trunk floor.

Within the trunk, a warning triangle and a first-aid box is fastened as a functional component for the operation of the motor vehicle. Here, it is desired that the warning triangle and the first-aid box do not simply lie on the trunk floor, but rather are fixed by corresponding fastening arrangements, in order to prevent movement, in particular slipping of the functional component within the trunk. Such fastening arrangements are complex to manufacture, however, and furthermore require additional installation space within the trunk.

SUMMARY

The present disclosure provides a motor vehicle in which functional components, for example a warning triangle or a first-aid box, can be fastened in the access region of the trunk reliably and in a space-saving manner with a mount having a small manufacturing expenditure of the motor vehicle. In one embodiment, the motor vehicle includes a body, at least one drive motor, in particular an internal combustion engine and/or an electric motor, a trunk, an inner lining fastened indirectly or directly to the body and delimiting the trunk, at least one functional component, such as a warning triangle and/or a first-aid box, which is fastened within the motor vehicle. The functional component is fastened in a holding position between the body and the inner lining. The functional component is fastened between the body and the inner lining in the holding position in an advantageous manner. In particular, an intermediate space between the body and the inner lining can be used as receiving space or respectively storage space for the functional component and furthermore the body and/or the inner lining can additionally fulfill the function of a mount for the functional component, so that thereby no additional complex fastening arrangements which are expensive to produce are necessary for the functional component. The body, with regard to which the functional component is fastened between this body and the inner lining, can be formed here both by a flap body, i.e. a part of the body which is constructed for the rear flap, and also by other parts of the body which indirectly or directly delimit the trunk, for example lateral parts of the body or rear parts of the body. This also applies in an analogous manner for the inner lining. The inner lining, with regard to which the functional component is fastened between the body and this inner lining, can be formed for example by a flap lining as part of the inner lining on the rear flap, and also by lateral linings on lateral parts of the body, which laterally delimit the trunk or else by an inner lining on the rear end region of the trunk.

In an additional embodiment, the functional component is fastened in a form- and/or force-fitting manner between the body and the inner lining. The inner lining and/or the body can also be used for the form-fitting fastening of the functional component through a corresponding shape construction. In addition, the functional component can be fastened in a force-fitting manner, for example owing to a pre-stressing of the arrangement of the functional component in the holding position between the body and the inner lining. The force-fitting fastening of the functional component in the holding position can be provided here also by at least one additional fastening element.

In a further embodiment, the inner lining includes an opening for introducing the functional component into the holding position and for moving out the functional component from the holding position for a use of the functional component. The inner lining therefore has the opening into which the functional component can be introduced from outside, i.e. from the region of the trunk, into the holding position through the opening and with a utilization or use of the functional component, the functional component can be moved out from the holding position for the use of the functional component.

In a supplementary variant, the functional component is fastened in the holding position in a form- and/or force-fitting manner by at least one additional fastening element, so that the additional fastening element and preferably the inner lining forms a mount for the functional component. The additional fastening element has a particular shape and/or geometry, which makes it possible to fasten the functional component in a form- and/or force-fitting manner in the intermediate space between the inner lining and the body.

Expediently, the additional fastening element is constructed in one piece with the inner lining, i.e. in one piece with a part of the inner lining. In the one-piece construction of the additional fastening element with the inner lining therefore the additional fastening element can be produced jointly during injection molding of the inner lining from plastic, in particular from thermoplastic or thermosetting plastic. The tool for injection molding the inner lining is therefore shaped accordingly, so that thereby both a part of the inner lining and also the additional fastening element can be produced jointly during injection molding. The costs for the production of the additional fastening element, i.e. the mount for the functional component, are thereby particularly low.

In a supplementary configuration, the inner lining and/or the additional fastening element is formed from plastic and/or is produced by injection molding.

In a further variant, the additional fastening element includes a rear support part, on which a rear side of the functional component rests. The rear support part lies on a rear side of the functional component. The rear side is constructed on the functional component opposite the front side and the front side faces the opening. In an additional configuration, the rear support part includes a plurality of ribs for support onto the functional component, and the ribs are connected to one another by a connecting plate.

In a supplementary configuration, the additional fastening element includes a first lateral support part and a second lateral support part, and a lateral support part lies in each case on a lateral outer side of the functional component in each case. Preferably, a lateral support part has an introduction slope and preferably the introduction slope is aligned at an acute angle to an imaginary horizontal plane. The introduction slope enables a particularly good introduction of the functional component into the opening, because the substantially horizontal introduction movement on the introduction slope involves a movement of the functional component vertically upwards on the introduction slope. The horizontal inserting of the introduction component into the opening therefore involves a vertical, upwardly directed movement of the functional component on the introduction slope. Thereby, the introducing of the functional component into the opening and the later positioning in the holding position is particularly simple.

In a supplementary configuration, the additional fastening element includes an additional fastening element, a lower holding wall and an underside of the functional component lies on the lower holding wall. The functional component therefore lies on the underside on the lower holding wall. In the holding position, the movement of the functional component is therefore delimited downward by the lower holding wall.

In a supplementary variant, the additional fastening element includes an upper holding wall and preferably an upper side of the functional component lies on the upper holding wall. In the holding position, the upper side of the functional component can also lie on the upper holding wall, so that in the holding position the functional component is fixed with an optional compressive prestressing between the lower holding wall and the upper holding wall. Deviating herefrom, a small vertical distance can also be formed between the upper side of the functional component and the upper holding wall in the holding position, so that a movement of the functional component is delimited in a vertically upwardly directed direction by the upper holding wall only in the case of particular movements of the motor vehicle, i.e. driving over bumps in the road surface.

In a supplementary embodiment, the lower and/or upper holding wall is fastened to the inner lining and preferably the lower and/or upper holding wall is connected to the rear support part. The lower and/or upper holding wall is fastened to the inner lining and preferably is produced in one piece during injection molding of the inner lining, i.e. a portion of the inner lining, with the latter. The rear holding support part can likewise be connected to the lower and/or upper holding wall, so that thereby the rear support part is connected indirectly to the lower or upper holding wall with the inner lining. The rear support part can also be produced during injection molding of the inner lining in one piece with the latter.

In a supplementary embodiment, the shape of the opening is constructed to the effect that in the holding position of the functional component on a part of the opening not covered by the functional component at least one intervention opening is present for the manual application of a force, directed in transverse direction or longitudinal direction of the motor vehicle, onto the functional component.

In an additional embodiment, on the inner lining on the inner side in the region of the opening, as edge of the inner lining on the opening at least one retaining extension, in particular at least one retaining lug, is formed and/or the motor vehicle includes a rear flap for loading and unloading the trunk, which flap is movable between a closed position and an open position, and the rear flap is formed on the outside by a part of the body as flap body and on the inside by a part of the inner lining as flap lining, and the at least one functional component is fastened in a holding position between the flap body and the flap lining.

Example embodiments of the present disclosure are described in further detail below with reference to the enclosed drawings.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
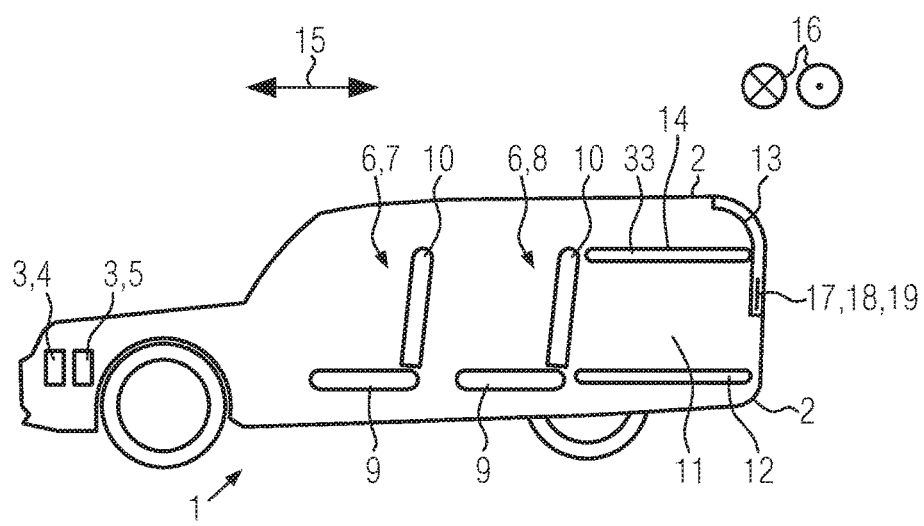
FIG. 1 is a longitudinal section or respectively side view of a motor vehicle.

A motor vehicle 1 illustrated in FIG. 1 has a body 2 of steel. The motor vehicle 1 is powered with a drive motor 3, namely an electric motor 4 and/or an internal combustion engine 5. The body 2 delimits an interior within which seats 6, namely front seats 7 and rear seats 8, are arranged to accommodate and convey occupants or respectively persons. Seats 6 each have a seat part 9 and a back part 10. Behind the rear seats 8 a trunk 11 is formed between the rear seat 8 and a pivotable rear flap 13. The trunk 11 is delimited on the underside by a trunk floor 12 and on the upper side by a parcel shelf 14. The trunk floor 12 serves to support loaded material on an upper side of the trunk floor 12. The trunk 11 is delimited laterally by lateral linings as part of an inner lining 42 and on the rear side by a flap lining 26 as part of the inner lining 42 and an inner lining 42 on the body 2. The rear flap 13 is formed on the outside partially by a flap body 25 as part of the body 2 and on the inside by the flap lining 26. A longitudinal direction 15 and a transverse direction 16 of the motor vehicle 1 are aligned horizontally.

Figure 2:
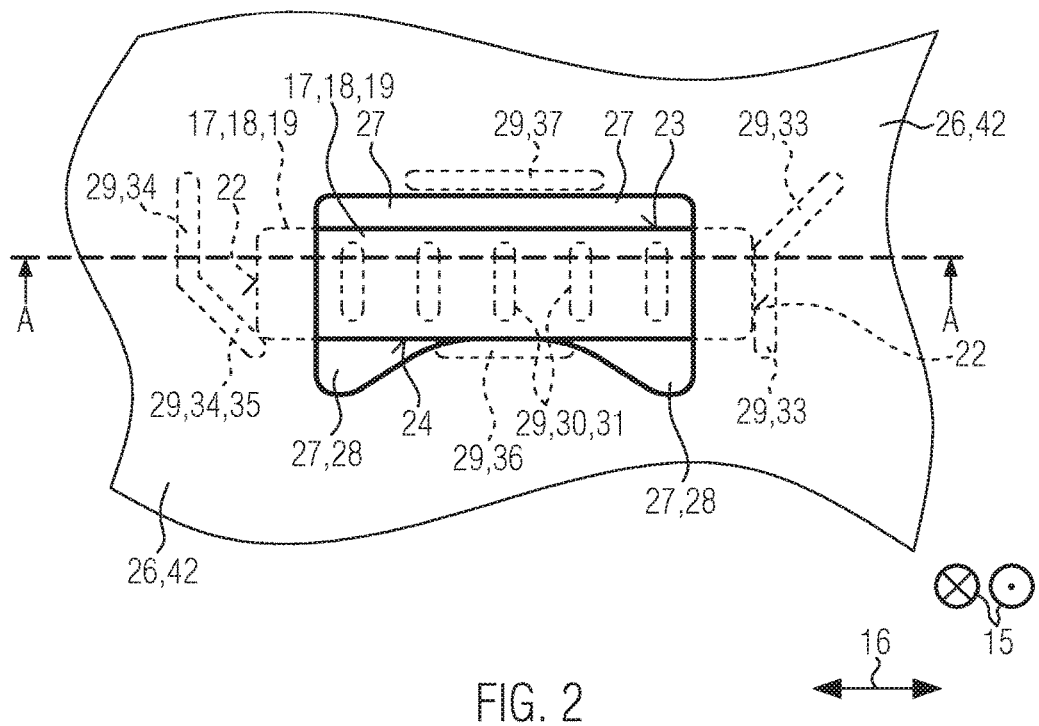
FIG. 2 is a top view onto an inside part of a rear flap of the motor vehicle illustrated in FIG. 1 showing an embodiment with an opening for introducing and taking out a functional component, for example a warning triangle or a first-aid box, in a vertical alignment of a flap lining owing to a closed position of the rear flap.
Figure 3:
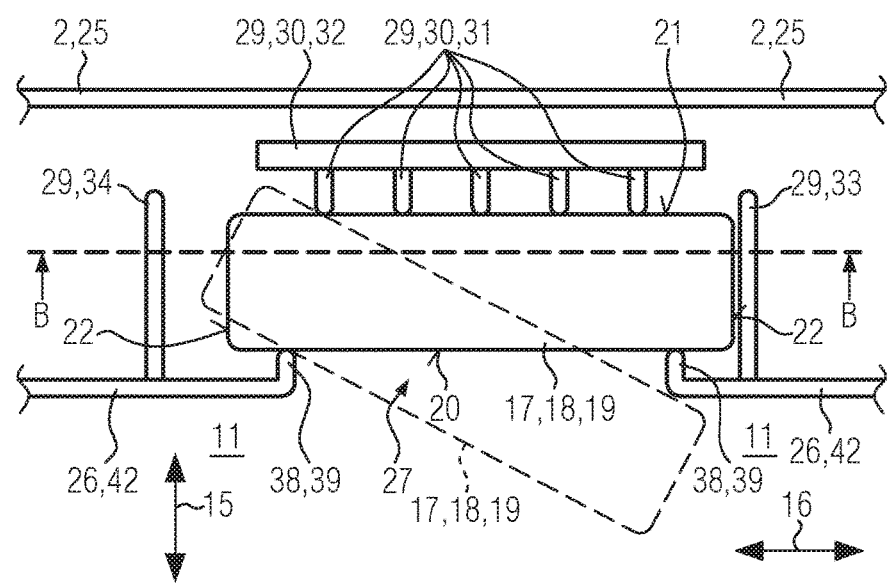
FIG. 3 is a horizontal section taken along line A-A shown in FIG. 2.
Figure 4:
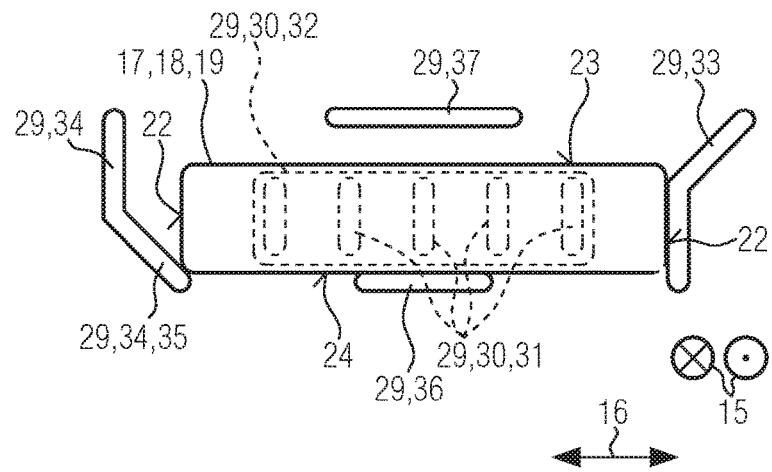
FIG. 4 is a vertical section taken along line B-B shown in FIG. 3.

In FIGS. 2 to 4, an embodiment is illustrated for a mount of a functional component 17, for example a warning triangle 18 or a first-aid box 19. The functional component 17 is fastened in a form- and/or force-fitting manner in a holding position between the flap lining 26 as part of the inner lining 42 on the rear flap 13 and the flap body 25 as part of the body 2 on the pivotable rear flap 13 by a plurality of additional fastening elements 29. The functional component 17 has a front side 20 facing an opening 27 in the holding position and a rear side 21, formed lying opposite to the front side 20. The flap lining 26 has the opening 27, in order to be able to take the functional component 17 out from the holding position according to the illustration in FIGS. 2 to 4, for the use of the functional component 17. Vice versa, through the opening, after a use of the functional component 17, the latter can be fastened in the holding position again. The functional component 17 has, in addition, two lateral outer sides 22 and an upper side 23 and an underside 24. At the edge or respectively end of the flap lining 26 in the region of the opening 27 a retaining extension 38 is formed as a retaining lug 39 running completely around the opening 27. Deviating herefrom, the retaining extension 38 can also be only partially constructed in circumferential direction in the region of the opening 27. On the front side 20 of the functional component 17 a counter-formfitting geometry complementary to the retaining extension 38 can be optionally formed, for example a completely circumferential groove, so that the completely circumferential retaining lug 39 is arranged within the groove and thereby a formfitting connection is formed between the counter-formfitting geometry and the retaining lug 39.

The front side 20 of the functional component 17 therefore lies in the holding position, illustrated in FIG. 3, on the retaining extension 38, and the rear side 21 of the functional component 17 lies on a rear support part 30. The rear support part 30 includes a plurality of ribs 31 and the ribs 31 are connected in one piece with a connecting plate 32. The functional component 17 therefore lies between the ends of the ribs 31 on the rear side 21 and the ends of the retaining extension 38 on the front side 20 and is therefore fastened in a form- and force-fitting manner in the holding position on the ribs 31 and the retaining extension 38 by a compressive prestressing between the ribs 31 and the retaining extension 38. In a closed position of the rear flap 13, which is illustrated in FIGS. 2 to 4, at the lower region of the opening 27 a horizontally aligned lower holding wall 36 is formed in the closed position of the rear flap 13. The underside 24 of the functional component 17 lies on the lower holding wall 36. In addition, an upper holding wall 37 is fastened to the flap lining 26. In the holding position, a slight vertical distance exists between the upper holding wall 37 and the upper side 23 of the functional component 17. When driving with the motor vehicle 1 over unevenness in the ground, a movement of the functional component 17 in a vertical direction upwards is thereby delimited by the upper holding wall 37.

The lateral outer side 22 illustrated on the right in FIGS. 2 to 4 lies on a first lateral support part 33 and the lateral outer side 22 illustrated on the left in FIG. 2 to 4 lies on a second lateral support part 34. In addition, an introduction slope 35 is formed on the second lateral support part 34. In FIG. 3 the functional component 17 is illustrated in the holding position by continuous lines, and in addition in FIG. 3 the functional component 17 is illustrated additionally during an introducing movement of the functional component 17 from outside into the opening 27. Owing to the introduction slope 35, a movement of the functional component 17 on introducing into the opening 27 with a movement component in horizontal direction involves a movement of the functional component 17 on the introduction slope 35 in a vertically upwardly directed direction. Thereby, on introducing of the functional component 17, the latter can be moved more easily into the holding position.

All the additional fastening elements 29, namely the rear support part 30, the two lateral support parts 33, 34 and the lower and upper holding walls 36, 37 and the retaining extension 38 are produced from thermoplastic plastic and are produced jointly during injection molding of the inner lining 42 as flap lining 26 on the rear flap 13 during injection molding with an injection molding tool with two tool parts. The costs for the production of the additional fastening elements 29 are thereby particularly low in an advantageous manner. The geometry of the opening 27 is, in addition, constructed to the effect that in the holding position according to the illustration in FIG. 2, i.e. the view onto the opening 27 in the holding position of the functional component 17, two intervention openings 28 are present. By the intervention openings 28, the upper side 23 and also the underside 24 can be grasped manually by hand, so that thereby a force can be applied onto the functional component 17 in transverse direction, i.e. a force directed toward the left, so that thereby owing to the introduction slope 35 the left-hand end region of the functional component 17 carries out a vertically upwardly directed movement on the introduction slope 35. Thereby, the functional component 17 can be taken out from the holding position in a particularly simple manner through the opening 27 into the trunk 11 or respectively into the environment of the motor vehicle 1.

Figure 5:
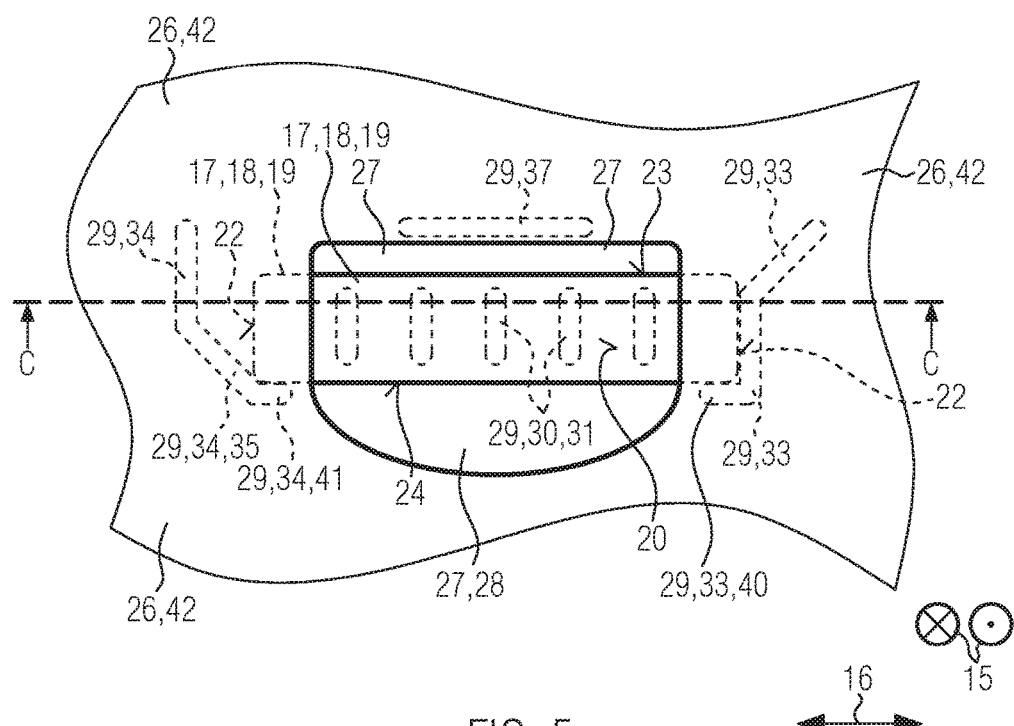
FIG. 5 is a top view onto the inside part of a rear flap of the motor vehicle shown illustrated in FIG. 1 showing another embodiment with the opening for introducing and taking out the functional component, for example the warning triangle or the first-aid box, in a vertical alignment of the flap lining owing to a closed position of the rear flap.
Figure 6:
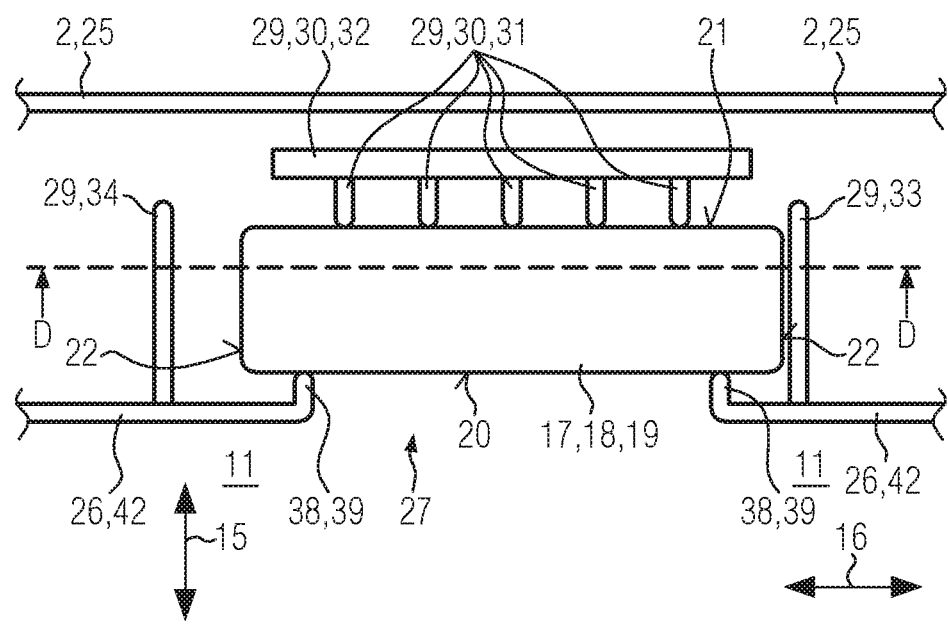
FIG. 6 is a horizontal section taken along line C-C shown in FIG. 5.
Figure 7:
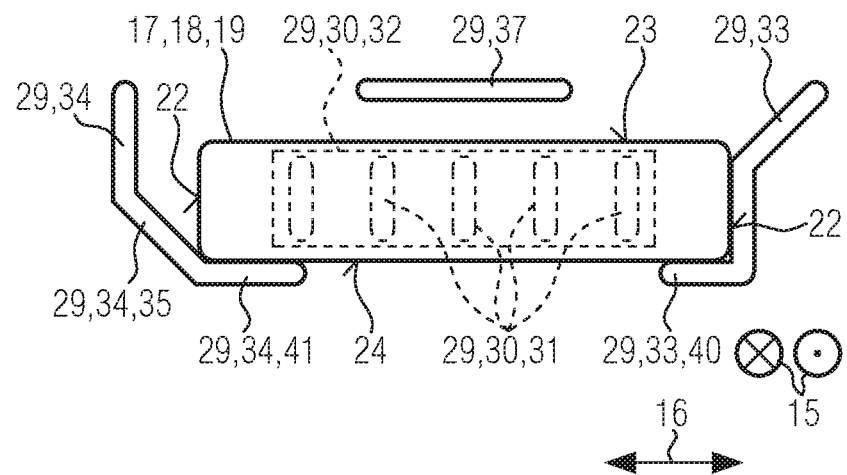
FIG. 7 is a vertical section taken along line D-D shown in FIG. 6.

In FIGS. 5 to 7, another embodiment of the motor vehicle 1 with the mount for the functional component 17 is illustrated. In the following, substantially only the differences to the first example embodiment illustrated in FIGS. 2 to 4 will be described. The mount for the functional component 17 has no separate lower holding wall 36. The underside 24 of the functional component 17 lies instead on a horizontally constructed holding section 40 of the first lateral support part 33 and a horizontal holding section 41 of the second lateral support part 34. The holding sections 40, 41 therefore form a lower holding wall 36. The geometry of the opening 27 is constructed to the effect that instead of the two individual intervention openings 28 beneath the underside 24 of the functional component 17 in the holding position according to the first example embodiment, in the second example embodiment only one larger intervention opening 28 is present beneath the underside 24 of the functional component 17 in the holding position (FIG. 5).

In a further embodiment of the motor vehicle 1, the functional component 17 is not fastened to the rear flap 13, but rather to the body 2 outside the rear flap 13, i.e. on a lateral lining as the inner lining 42, which laterally delimits the trunk 11 and the part of the body 2 laterally on the trunk 12.

Viewed as a whole, substantial advantages are linked to the motor vehicle 1 according to the present disclosure. The functional components 17, i.e. the warning triangle 18 and the first-aid box 19, are fastened between the inner lining 42 and the body 2 in the holding position by the additional fastening elements 29. Complex separate fastening devices for the functional components 17 are not necessary, and the additional fastening elements 29 can be jointly produced inexpensively during the injection molding of the inner lining 42. A total of two openings 27, respectively with corresponding additional fastening elements 29, are present on the inner lining 42, so that both the warning triangle 18 and also the first-aid box 19 can be fastened between the inner lining 42 and the body 2 securely, reliably and inexpensively.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle comprising:
    a body having a trunk with an inner lining delimiting and secured within the trunk;
    a trunk lid movable between a closed position and an open position for loading and unloading the trunk, wherein the trunk lid is formed on the outside by a flap body as part of the body and on the inside by a flap lining as part of the inner lining; and
    a fastening element formed between the flap body and the flap lining, wherein the fastening element is configured to releasably secure a functional component to the trunk lid in a holding position between the flap body and the flap lining,
    wherein the flap lining has an opening formed therein and configured to introduce the functional component into the holding position and remove the functional component from the holding position for a use thereof, and
    wherein the opening comprises at least one intervention opening configured to enable manual application of a force directed onto the functional component.

2. The motor vehicle according to claim 1, wherein the functional component is fastened in a form-fitting manner between the flap body and the flap lining.

3. The motor vehicle according to claim 1, wherein the functional component is fastened in a force-fitting manner between the flap body and the flap lining.

4. The motor vehicle according to claim 1, further comprising a second fastening element which in combination with the fastening element forms a mount for the functional component.

5. The motor vehicle according to claim 4, wherein the second fastening element is integral with the flap lining.

6. The motor vehicle according to claim 4 wherein at least one of the flap lining and the second fastening element is constructed from plastic.

7. The motor vehicle according to claim 4, wherein the second fastening element comprises a rear support part on which a rear side of the functional component lies.

8. The motor vehicle according to claim 7, wherein the rear support part comprises a plurality of ribs configured to support the functional component, wherein the ribs are connected to one another by a connecting plate.

9. The motor vehicle according to claim 4, wherein the second fastening element comprises a first lateral support part and a second lateral support part, wherein the first and second lateral support parts are configured to lie on lateral outer sides of the functional component.

10. The motor vehicle according to claim 9, wherein at least one of the first and second lateral support parts comprises an introduction slope aligned in an acute angle to an imaginary horizontal plane.

11. The motor vehicle according to claim 9, wherein the second fastening element further comprises a horizontal holding section extending inwardly from an end of each of the first and second lateral support parts.

12. The motor vehicle according to claim 4, wherein the second fastening element comprises a lower holding wall configured to support an underside of the functional component.

13. The motor vehicle according to claim 12, wherein the lower holding wall is fastened to the flap lining.

14. The motor vehicle according to claim 4, wherein the second fastening element comprises an upper holding wall configured to support an upper side of the functional component.

15. The motor vehicle according to claim 14, wherein the upper holding wall is fastened to the flap lining.

16. A motor vehicle comprising:
    a body having a trunk with an inner lining delimiting and secured within the trunk;
    a trunk lid movable between a closed position and an open position for loading and unloading the trunk, wherein the trunk lid is formed on the outside by a flap body as part of the body and on the inside by a flap lining as part of the inner lining; and
    a first fastening element formed between the flap body and the flap lining, wherein the first fastening element is configured to releasably secure a functional component to the trunk lid in a holding position between the flap body and the flap lining; and
    a second fastening element which in combination with the fastening element forms a mount for the functional component, wherein the second fastening element comprises a rear support part on which a rear side of the functional component lies, and
    wherein the rear support part comprises a plurality of ribs configured to support the functional component, wherein the ribs are connected to one another by a connecting plate.

17. The motor vehicle according to claim 16, wherein the flap lining has an opening formed therein and configured to introduce the functional component into the holding position and remove the functional component from the holding position for a use thereof.

18. The motor vehicle according to claim 17, wherein the opening comprises at least one intervention opening configured to enable manual application of a force directed onto the functional component.

19. The motor vehicle according to claim 16, further comprising a first lateral support part and a second lateral support part configured to lie on lateral outer sides of the functional component that, in combination with the fastening element, form a mount for the functional component, wherein at least one of the first and second lateral support parts comprises an introduction slope aligned in an acute angle to an imaginary horizontal plane.

20. A exterior swing panel for a motor vehicle configured to stow a functional component comprising:
    an outer body panel having an exterior surface and an interior surface;
    an inner body panel spaced apart from the interior surface of the outer body panel and having at least one opening configured to receive the functional component in a holding position and remove the functional component from the holding position for a use thereof, wherein the at least one opening comprises at least one intervention opening configured to enable manual application of a force directed onto the functional component; and a fastening structure for releasably securing the functional component between the outer and inner body panels, the fastening structure including:
  a lateral support structure extending from the inner body panel toward the outer body panel and including a first lateral support adjacent the opening and a second lateral support on an opposite side of opening from the first lateral support;
  a horizontal support structure extending from the inner body panel toward the outer body panel and including at least one holding wall adjacent the opening and perpendicular to the lateral support structure; and
  a rear support structure disposed in an interior space defined between the outer and inner body panels subjacent to the opening.

* * * * *